(12) United States Patent
Srivastava et al.

(10) Patent No.: US 7,512,954 B2
(45) Date of Patent: Mar. 31, 2009

(54) METHOD AND MECHANISM FOR DEBUGGING A SERIES OF RELATED EVENTS WITHIN A COMPUTER SYSTEM

(75) Inventors: Alok Kumar Srivastava, Newark, CA (US); Ivan Tinlung Lam, Santa Clara, CA (US); Sunil Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 383 days.

(21) Appl. No.: 10/208,120

(22) Filed: Jul. 29, 2002

(65) Prior Publication Data

US 2005/0160431 A1 Jul. 21, 2005

(51) Int. Cl.
*G06F 3/00* (2006.01)
*G06F 9/44* (2006.01)
*G06F 9/46* (2006.01)
*G06F 13/00* (2006.01)
*G06F 11/00* (2006.01)

(52) U.S. Cl. .................. 719/318; 717/124; 717/127; 717/128; 714/45

(58) Field of Classification Search .............. 717/4, 717/124, 127–128; 714/127, 45; 711/147; 709/213, 201; 712/28; 719/318
See application file for complete search history.

(56) References Cited

U.S. PATENT DOCUMENTS

| | | | |
|---|---|---|---|
| 3,707,725 A | 12/1972 | Dellhelm | |
| 4,462,077 A | 7/1984 | York | |
| 5,390,316 A * | 2/1995 | Cramer et al. | 709/201 |
| 5,537,319 A | 7/1996 | Schoen | |
| 5,594,904 A | 1/1997 | Linnermark et al. | |
| 5,642,478 A * | 6/1997 | Chen et al. | 714/45 |
| 5,649,085 A | 7/1997 | Lehr | |
| 5,689,636 A | 11/1997 | Kleber et al. | |
| 5,708,825 A | 1/1998 | Sotomayor | |
| 5,870,606 A | 2/1999 | Lindsey | |
| 5,920,719 A | 7/1999 | Sutton et al. | |
| 5,963,740 A | 10/1999 | Srivastava et al. | |
| 6,026,362 A | 2/2000 | Kim et al. | |
| 6,083,281 A | 7/2000 | Diec et al. | |
| 6,164,841 A | 12/2000 | Mattson, Jr. et al. | |

(Continued)

OTHER PUBLICATIONS www.google.com, searched on Mar. 21, 2005 pp. 1-12, located at http://greenspun.com/seia/glossary.

(Continued)

*Primary Examiner*—Thomas Lee
*Assistant Examiner*—Qing-Yuan Wu
(74) *Attorney, Agent, or Firm*—Vista IP Law Group, LLP.

(57) ABSTRACT

The present invention provides a method and mechanism for debugging a series of related events within a computer system. According to an embodiment, when tracing a series of related events that span across a plurality of threads, a token may be passed from one thread to another, thereby allowing a link between the threads to be marked within the one or more traces. The token may be passed via a messaging API, such as a network layer API or a shared resource. With this aspect of the invention, sufficient information will be provided within the one or more traces to allow all the related trace data to be linked together.

38 Claims, 6 Drawing Sheets

U.S. PATENT DOCUMENTS

| | | | |
|---|---|---|---|
| 6,189,141 B1 | 2/2001 | Benitez et al. | |
| 6,202,099 B1 | 3/2001 | Gillies et al. | |
| 6,202,199 B1 | 3/2001 | Wygodny et al. | |
| 6,282,701 B1 | 8/2001 | Wygodny et al. | |
| 6,289,503 B1 | 9/2001 | Berry et al. | |
| 6,311,326 B1 | 10/2001 | Shagam | |
| 6,338,159 B1 | 1/2002 | Alexander, III et al. | |
| 6,339,775 B1 | 1/2002 | Zamanian et al. | |
| 6,339,776 B2 | 1/2002 | Dayani-Fard | |
| 6,349,406 B1 | 2/2002 | Levine et al. | |
| 6,351,844 B1 | 2/2002 | Bala | |
| 6,353,898 B1* | 3/2002 | Wipfel et al. | 714/48 |
| 6,353,924 B1 | 3/2002 | Ayers et al. | |
| 6,470,349 B1 | 10/2002 | Heninger et al. | |
| 6,480,886 B1 | 11/2002 | Paice | |
| 6,507,805 B1 | 1/2003 | Gordon et al. | |
| 6,513,155 B1 | 1/2003 | Alexander, III et al. | |
| 6,546,548 B1 | 4/2003 | Berry et al. | |
| 6,553,564 B1 | 4/2003 | Alexander, III et al. | |
| 6,574,792 B1 | 6/2003 | Easton | |
| 6,584,491 B1* | 6/2003 | Niemi et al. | 709/202 |
| 6,598,012 B1 | 7/2003 | Berry et al. | |
| 6,654,749 B1 | 11/2003 | Nashed | |
| 6,658,652 B1 | 12/2003 | Alexander, III et al. | |
| 6,678,883 B1 | 1/2004 | Berry et al. | |
| 6,694,507 B2 | 2/2004 | Arnold et al. | |
| 6,708,173 B1 | 3/2004 | Behr et al. | |
| 6,715,140 B1 | 3/2004 | Haga | |
| 6,732,095 B1 | 5/2004 | Warshavsky et al. | |
| 6,738,778 B1 | 5/2004 | Williamson et al. | |
| 6,738,965 B1 | 5/2004 | Webster | |
| 6,748,583 B2 | 6/2004 | Aizenbud-Reshef et al. | |
| 6,751,753 B2 | 6/2004 | Nguyen et al. | |
| 6,754,890 B1 | 6/2004 | Berry et al. | |
| 6,802,054 B2 | 10/2004 | Faraj | |
| 6,826,747 B1 | 11/2004 | Augsburg et al. | |
| 6,862,711 B1 | 3/2005 | Bahrs et al. | |
| 6,877,081 B2 | 4/2005 | Herger et al. | |
| 6,944,797 B1 | 9/2005 | Guthrie et al. | |
| 7,017,084 B2* | 3/2006 | Ng et al. | 714/45 |
| 7,165,190 B1 | 1/2007 | Srivastava et al. | |
| 7,251,809 B2 | 7/2007 | Barclay et al. | |
| 2001/0011360 A1 | 8/2001 | Shigeta | |
| 2002/0004803 A1 | 1/2002 | Serebrennikov | |
| 2002/0016771 A1 | 2/2002 | Carothers et al. | |
| 2002/0019837 A1 | 2/2002 | Balnaves | |
| 2002/0066081 A1 | 5/2002 | Duesterwald et al. | |
| 2002/0073063 A1 | 6/2002 | Faraj | |
| 2002/0078143 A1 | 6/2002 | De Boor et al. | |
| 2002/0087592 A1 | 7/2002 | Ghani | |
| 2002/0087949 A1 | 7/2002 | Golender et al. | |
| 2002/0095660 A1 | 7/2002 | O'Brien et al. | |
| 2002/0107882 A1 | 8/2002 | Gorelick et al. | |
| 2002/0120634 A1 | 8/2002 | Min et al. | |
| 2002/0133806 A1 | 9/2002 | Flanagan et al. | |
| 2002/0161672 A1 | 10/2002 | Banks et al. | |
| 2003/0088854 A1 | 5/2003 | Wygodny et al. | |
| 2003/0140045 A1 | 7/2003 | Heninger et al. | |
| 2003/0196192 A1* | 10/2003 | Barclay et al. | 717/128 |
| 2004/0158819 A1 | 8/2004 | Cuomo et al. | |
| 2004/0205718 A1 | 10/2004 | Reynders | |
| 2004/0210877 A1* | 10/2004 | Sluiman et al. | 717/130 |
| 2004/0216091 A1 | 10/2004 | Groeschel | |
| 2004/0216092 A1 | 10/2004 | Ayers et al. | |

OTHER PUBLICATIONS

IBM Technical Disclosure Bulletin "Checkref: Method for Effectively Identifying IBM Bookmaster Document Markup Language Coding Errors" (Feb. 1994) pp. 379-392.

Biswas, P. et al. "Trace Driven Analysis of Write Caching Policies for Disks" *Proceedings of the 1993 ACM Sigmetrics Conference on Measurement and Modeling of Computer Systems* (1993) pp. 13-23.

Borg, A. et al. "Generation and Analysis of Very Long Address Traces" *Proceedings of the 17th Annual International Symposium on Computer Architecture* (May 1990) 18(3):270-279.

Chang, P. P. and W.-M. W. HWU "Trace Selection for Compiling Large C Application Programs to Microcode" *Proceedings of the 21st Annual Workshop on Microprogramming and Microarchitecture* (Jan. 1988) pp. 21-29.

Colby, C. and P. Lee "Trace-Based Program Analysis" *Proceedings of the 23rd ACM SIGPLAN-SIGACT Symposium on Principles of Programming Languages* (Jan. 1996) pp. 195-207.

Dan, A. et al. "Characterization of Database Access Pattern for Analytic Prediction of Buffer Hit Probability" *VLBD Journal* (1995) 4:127-154.

Ducassé, M. "Coca: An automated Debugger for C" *Proceedings of the 21st International Conference on Software Engineering* (May 1999) pp. 504-513.

Ezust, S.A. and G. v. Bochmann "An Automatic Trace Analysis Tool Generator for Estelle Specifications" *Proceedings of the Conference on Applications, Technologies, Architectures and Protocols for Computer Communication* (Oct. 1995) 25(4):175-184.

Goldszmidt, G. S. and S. Yemini "High-Level Language Debugging for Concurrent Programs" *ACM Transactions on Computer Systems (TOCS)* (Nov. 1990) 8(4):311-336.

Hsu, W. W. et al. "I/O Reference Behavior of Production Database Workloads and the TPC Benchmarks—An Analysis at the Logical Level" *ACM Transactions on Database Systems (TODS)* (Mar. 2001) 26(1):96-143.

LeDoux, C. H. and D. S. Parker, Jr. "Saving Traces for ADA Debugging" *Proceedings of the 1985 Annual ACM SIGAda International Conference on Ada* (May 1985) V(2):97-108.

Lencevicius, R. et al. "Third Eye—Specification-Based Analysis of Software Execution Traces" *Proceedings of the 22nd International Conference on Software Engineering* (Jun. 2000) p. 772.

Lo, J. L. et al. "An Analysis of Database Workload Performance on Simultaneous Multithreaded Processors" *Proceedings of the 25th Annual International Symposium on Computer Architecture* (Apr. 1998) 26(3):39-50.

Miller, B.P. and J.-D. Choi "A Mechanism for Efficient Debugging of Parallel Programs" *Proceedings of the ACM SIGPLAN 1998 Conference on Programming Language Design and Implementation* (Jun. 1988) pp. 135-144.

Putrycz, E. "Using Trace Analysis for Improving Performance in COTS Systems" *Proceedings of the 2004 Conference of the Centre for Advanced Studies on Collaborative Research* (Oct. 2004) pp. 1-13.

Rahm. E. "Empirical Performance Evaluation of Concurrency and Coherency Control Protocols for Database Sharing Systems" *ACM Transactions on Database Systems (TODS)* (Jun. 1993) 18(2):333-377.

Ramakrishnan, K. K. "Analysis of File I/O Traces in Commercial Computing Environments" *Proceedings of the 1992 ACM SIGMETRICS Joint International Conference on Measurement and Modeling of Computer Systems* (Jun. 1992) 20(1):78-90.

Reiss, S.P. and M. Renieris "Generating Java Trace Data" *Proceedings of the ACM 2000 Conference on Java Grande* (Jun. 2000) pp. 71-77.

Singhal, V. and A.J. Smith "Analysis of locking behavior in three real database systems" *The VLDB Journal* (1997) 6:40-52.

Agosti, Maristelle and Alan Smeation. 1996. *Information Retrieval and Hypertext.* Boston: Kluwer Academic Publishers. ISBN 0-7923-9710-X.

Akscyn, Robert, Donald McCracken, and Elise Yoder. 1987. "KMS: A Distributed Hypermedia System for Managing Knowledge in Organizations." In *Proceedings of Hypertext '87,* Chapel Hill, NC. Nov. 13-15, 1987. NY: Association for Computing Machinery Press, pp. 1-20.

Berners-Lee, T. and L. Masinter, editors. Dec. 1994. "Uniform Resource Locators (URL)", IETF document RFC 17338.

Bradner, S. editor. Key words for use in RFCs to Indicate Requirement Levels. Mar. 1997, ietf.org/rfc/rfc2119.txt.

Bray, Tim, Dave Hollander, and Andrew Layman, editors. Namespaces in XML. Textuality, Hewlett-Packard, and Microsoft. World Wide Web Consortium, 1999, http://www.w3.org/TR/REC-xml-names/.

Bray, Tim, Jean Paoli, and C.M. Sperberg-McQueen, editors. Extensible Markup Language (XML) 1.0. World Wide Web Consortium, Oct. 2000, w3.org/TR/REC-xml.

Bush, Vannevar, 1945. "As We May Think," *Atlantic Monthly* 176 Jul. 1945, pp. 101-108.

Catano, James V. 1979. "Poetry and Computers: Experimenting with the Communal Text." In *Computers and the Humanities* 13 (9): pp. 269-275.

Chatterjee, Sunojit, "Trace Navigation and Analyzer Tool Prototype (High Level Design: First Draft" Apr. 12, 2000.

Clark, James and Steve DeRose, editors. XML Path Language (XPath). World Wide Web Consortium, 1999, w3.org/TR/xpath.

Conkin, Jeff. 1987. "Hypertext: An Introduction and Survey," *IEEE Computer* 20 (9): pp. 17-41.

Cowan, John and David Megginson, editors. XML Information Set. World Wide Web Consortium, Dec. 1999, w3.org/TR/xml-infoset-19991220.

DeRose, Steve and Andries van Dam. 1999. "Document structure and markup in the FRESS Hypertext System," Markup Languages 1 (1) Winter. Cambridge: MIT Press: pp. 7-32.

DeRose, Steve, editor, XML XLink Requirements Version 1.0. Brown University. Seekonk: World Wide Web Consortium, 1999.

DeRose, Steve, editor. XML XPointer Language Requirements Version 1.0. World Wide Consortium, 1999. (See w3.org/TR/NOTE-xptr-req.).

DeRose, Steve, Eve Maler, David Orchard, and Ben Trafford, editors. XML Linking Language (XLink). World Wide Web Consortium, Dec. 2000. http://www.w3.org/TR/xlink/.

DeRose, Steven J. 1989. "Expanding the Notion of Links." In *Proceedings of Hypertext '89*, Pittsburgh, PA. NY: Association for Computing Machinery Press.

Document Object Model (DOM) Level 2 Specification: Version 1.0 World Wide Web Consortium, 1999. (See w3.org/TR/DOM-Level-2/.).

Dürst, Martin et al., eds, "*Character Model for the World Wide Web 1.0*", World Wide Web Consortium, 2001. w3.org/TR/2001/WD-charmod-20010126/.

Engelbart, Douglas C. 1963. "A Conceptual Framework for the Augmentation of Man's Intellect". In *Vistas in Information Handling*, vol. 1 (P. Howerton, ed.). Washington, DC: Spartan Books: 1-29. Reprinted in Greif, Irene (ed.), 1988. *Computer-Supported Cooperative Work: A Book of Readings*. San Mateo, California: Morgan Kaufmann Publishers, pp. 35-65. ISBN 0934613575.

Furuta, Richard, Frank M. Shipmann III, Catherine C. Marshall, Donald Brenner, and Hao-wei Hsieh, 1997. "Hypertext paths and the World-Wide Web: Experiences with Walden's Paths." In *Proceedings of Hypertext '97*. NY: Association for Computing Machinery Press.

Garrett, L. Nancy, Karen E. Smith, and Norman Meyrowitz. 1986. "Intermedia: Issues, Strategies, and Tactics in the Design of a Hypermedia System." In *Proceedings of the Conference on Computer-Supported Cooperative Work*.

Gibson, David, Jon Kleinberg, and Prabhakar Raghavan. 1998. "Inferring Web Communites from Link Topology." In *Proceedings of Hypertext '98*, Pittsburgh, PA. NY: Association for Computing Machinery Press.

Grønbæk, Kaj and Randall H. Trigg. 1996. "Toward a Dexter-based model for open hypermedia: Unifying embedded references and link objects," In Proceedings of Hypertext '96. Association for Computing Machinery Press. Also available online.

Halasz, Frank. 1987. "Reflections on NoteCards: Seven Issues for the Next Generation of Hypermedia Systems," Address presented at Hypertext '87, Nov. 13-15, 1987. Reprinted in *Communications of the Association for Computing Machinery* 31 (7), Jul. 1988: 836-855.

Halasz, Frank. 1994. "The Dexter Hypertext Reference Model." In *Communications of the Association for Computing Machinery* 37 (2), Feb. 1994: 30-39.

Hall, Wendy, Hugh Davis, and Gerard Hutchings. 1996. *Rethinking Hypermedia: The Microcosm Approach*. Boston: Kluwer Academic Publishers. ISBN 0-7923-9679-0.

Hardman, Lynda, Dick C. A. Bulterman, and Guido van Rossum. 1994. "The Amsterdam Hypermedia Model: Adding Time and Context to the Dexter Model." In *Communications of the Association for Computing Machinery* 37.2 (Feb. 1994): 50-63.

Hinden, R., et al., "Format for Literal IPv6 Addresses in URL's." Internet Engineering Task Force, 1999. (See ietf.org/rfc/rfc2732.txt.).

ISO/IEC 10744-1992 (E). Information technology -Hypermedia/Time-based Structuring Language (HyTime). Geneva: International Organization for Standardization, 1992. Extended Facilities Annex. [Geneva]: International Organization for Standardization, 1996. (See http://www.ornl.gov/sgml/wg8/docs/n1920/html/n1920.html.).

Kahn, Paul. 1991. "Linking Together Books: Experiments in Adapting Published Material into Intermedia Documents." In Paul Delany and George P. Landow (eds), *Hypermedia and Literary Studies*. Cambridge: MIT Press.

Landow, George P. 1987. "Relationally Encoded Links and the Rhetoric of Hypertext." In *Proceedings of Hypertext '87*, Chapel Hill, NC, Nov. 13-15, 1987. NY: Association for Computing Machinery Press: 331-344.

Lassila, Ora and Ralph Swick, editors. Resource Description Framework (RDF) Model and Syntax Specification. World Wide Web Consortium, 1999. http://www.w3.org/TR/REC-rdf-syntax/.

Maler, Eve and Steve DeRose, editors. XML Linking Language (XLink) World Wide Web Consortium, Mar. 1998. w3.org/TR/1998/WD-xlink-19980303.

Marsh, Jonathan, editor, XML Base (XBase), World Wide Web Consortium, Dec. 1999. w3.org/TR/1999/WD-xmlbase-19991220.

Marshall, Catherine C., Frank M. Shipman, III, and James H. Coombs. 1994. "VIKI: Spatial Hypertext Supporting Emergent Structure". In *Proceedings of the 1994 European Conference on Hypertext*. NY: Association for Computing Machinery Press.

Meyrowitz, Norman. 1986. "Intermedia: the Architecture and Construction of an Object-Oriented Hypermedia system and Applications Framework." In *Proceedings of OOPSLA*. Portland, OR.

Nelson, Theodore H, "Literary Machines", Mindful Press, Sausalito, 1992.

Raggett, Dave et al., "HTML 4.01 Specification", World Wide Web Consortium, Dec. 1999. w3.org/TR/html4/.

Sperberg-McQueen C.M. and Lou Burnard, editors.Guidelines for Electronic Text Encoding and Interchange. Association for Computers and the Humanities (ACH), Association for Computational Linguistics (ACL), and Association for Literary and Linguistic Computing (ALLC). Chicago, Oxford: Text Encoding Initiative, 1994.

Trigg, Randall H. 1988. "Guided Tours and Tabletops: Tools for Communicating in a Hypertext Environment." In *ACM Transactions on Office Information Systems*, 6.4 (Oct. 1988): 398-414.

Trigg, Randall H. 1991, "From Trailblazing to Guided Tours: The Legacy of Vannevar Bush's. Vision of Hypertext Use," In Nyce, James M. and Paul Kahn, eds, 1991, From Memex to Hypertext: Vannevar Bush and the Mind's Machine. San Diego: Academic Press, pp. 353-367. A thorough review.

van Ossenbruggen, Jacco, Anton Eliëns and Lloyd Rutledge. "The Role of XML in Open Hypermedia Systems." Position paper for the 4th Workshop on Open Hypermedia Systems, ACM Hypertext '98. http://aue.auc.dk/~kock/OHS-HT98/Papers/ossenbruggen.html.

Whitehead, E., "XML Media Types." Internet Engineering Task Force, Network Working Group, Jul. 1998. ietf.org/rfc/rfc2376.txt.

*XHTML 1.0: The Extensible HyperText Markup Language*, World Wide Web Consortium, Jan. 2000. (See w3.org/TR/2000/REC-xhtml1-20000126/.

Yankelovich, Nicole, Bernard J. Haan, Norman K. Meyrowitz, and Steven M. Drucker. 1988. "Intermedia: The Concept and the Construction of a Seamless Information Environment." *IEEE Computer* (Jan. 1988): 81-96.

Yankelovich, Nicole, Norman Meyrowitz, and Andries van Dam. 1985. "Reading and Writing the Electronic Book,"*IEEE Computer* 18 (Oct. 1985): 1-30.

Yergeau, F., Network Working Group, "UTF-8, a transformation format of ISO 10646," Internet Engineering Task Force, 1998. http://www.ietf.org/rfc/rfc2279.txt.

Zellweger, Polle T. 1989. "Scripted Documents: A Hypermedia Path Mechanism," In *Proceedings of Hypertext '89*, NY: Association for Computing Machinery Press, Nov. 1989.

Helmbold, D.P. et al. "Detecting Data Races from Sequential Traces" IEEE (1991) pp. 408-417.

Tolujev, J. et al. "Assessment of Simulation Models Based on Trace-File Analysis: A Metamodeling Approach" IEEE Proceedings of the 1998 Winter Simulation Conference (1998) 1:443-450.

Helmbold, D.P. "Determining Possible Event Orders by Analyzing Sequential Traces" IEEE (Jul. 1993) 4(7):827-840.

Palnitkar, S. et al. "Finite State Machine Trade Analysis Program" IEEE (1994) pp. 52-57.

Metalanguage, http://en.wikipedia.org/wiki/Meta-language, accessed on Feb. 2, 2006, pp. 1-3.

Webster, Document Interchange Standards, Wiley Encyclopedia of Electrical and Electronics Engineering (1999), pp. 33-39.

Azimi, et al. "A software approach to multiprocessor address trace generation" Computer Software and Applications Conference, 1990, COMPSAC 90. Proceedings., 14th Annual International, 1990, IEEE, pp. 99-105.

Malloy, "Trace-driven and program-driven simulation: a comparison", Modeling, Analysis, and Simulation of Computer and Telecommunication Systems, 1994., MASCOTS '94., Proceedings of the Second International Workshop on, 1994, IEEE, pp. 395-396.

Dauphin, et al., "Simple: a universal tool box for event trace analysis" Computer Performance and Dependability Symposium, 1996., Proceedings of IEEE International, 1996, p. 59.

Leung, "A tool for testing hypermedia systems", Euromicro Conference 1999. Proceedings, 25th vol. 2, 1999, IEEE, pp. 202-209.

Ding, "Reverse mapping of referral links from storage hierarchy for Web documents", Tools with Artificial Intelligence, 2000, ICTAI 2000. Proceedings, 12th IEEE International Conference on, 2000, IEEE, pp. 216-219.

Surray et al. "Using technology to tailor electronic information to users", Professional Communication Conference, 1996, IPCC '96 Proceedings. Communication on the Fast Track, International, 1996, IEEE, pp. 209-214.

\* cited by examiner

METHOD AND MECHANISM FOR DEBUGGING A SERIES OF RELATED EVENTS WITHIN A COMPUTER SYSTEM

BACKGROUND AND SUMMARY

Tracing is an approach for logging the state of computer applications at different points during its course of execution. Tracing is normally implemented by inserting statements in the computer application code that outputs status/state messages ("traces") as the statements are encountered during the execution of the code. Statements to generate traces are purposely placed in the computer application code to generate traces corresponding to activities of interest performed by specific sections of the code. The generated trace messages can be collected and stored during the execution of the application to form a trace log.

Programmers often use tracing and trace logs to diagnose problems or errors that arise during the execution of a computer application. When such a problem or error is encountered, trace logs are analyzed to correlate trace messages with the application code to determine the sequence, origin, and effects of different events in the systems and how they impact each other. This process allows analysis/diagnoses of unexpected behavior or programming errors that cause problems in the application code.

In a parallel or distributed environment, there are potentially a number of distributed network nodes, with each node running a number of distinct execution entities such as threads, tasks or processes, which may comprise of a plurality of threads. In many modern computer applications, these threads perform complex interactions with each other, even across the network to threads on other nodes. Often, each of the distributed nodes maintains a separate log file to store traces for their respective threads. Each distributed node may also maintain multiple trace logs corresponding to separate threads on that node.

Diagnosing problems using multiple trace logs often involves a manual process of repeatedly inspecting different sets of the trace logs in various orders to map the sequence and execution of events in the application code. This manual process attempts to correlate events in the system(s) with the application code to construct likely execution scenarios that identify root causes of actual or potential execution problems. Even in a modestly distributed system of a few nodes, this manual process comprises a significantly complex task, very much limited by the capacity of a human mind to comprehend and concurrently analyze many event scenarios across multiple threads on multiple nodes. Therefore, analyzing traces to diagnose applications in parallel and/or distributed systems and/or single node systems is often a time consuming and difficult exercise fraught with the potential for human limitations to render the diagnosis process unsuccessful. In many cases, the complexity of manual trace analysis causes the programmer to overlook or misdiagnose the real significance of events captured in the trace logs. With the increasing proliferation of more powerful computer systems capable of greater execution loads across more nodes, the scope of this problem can only increase.

An improved approach to diagnosing computer systems and applications uses trace messages that are materialized in a markup language syntax. Hyperlinks can be placed in the trace messages to facilitate navigation between sets of related traces. One method to generate trace messages having markup language syntax is to first generate trace strings from an application having a known set of fixed formats, in which the process for extracting information to create a new version of the trace in a markup language syntax is driven by knowledge of the position and existence of specific data in the trace strings. This type of approach is described in more detail in co-pending U.S. patent application Ser. No. 09/872,647, entitled "Method and Mechanism for Diagnosing Computer Applications Using Traces," filed on May 31, 2001, which is hereby incorporated by reference in its entirety.

Further, traces with markup language syntax may also be generated using non-fixed format traces. In this approach, each set of traces may correspond to a defined trace format grammar, wherein the process for extracting information to create a new version of the trace in a markup language syntax is driven by the corresponding defined trace format grammar (TFG). Thus, if change to the trace format is desired, then an additional TFG may be defined instead of having to change the code of the corresponding tools to navigate through the traces. This type of approach is described in more detail in co-pending U.S. patent application Ser. No. 09/872,590, entitled "Method and Mechanism for Using a Meta-Language to Define and Analyze Traces," filed on May 31, 2001, which is hereby incorporated by reference in its entirety.

Embodiments of the present invention provide methods and mechanisms for debugging a series of related events within a computer system. According to an embodiment, when tracing a series of related events that span across a plurality of threads, a token may be passed from one thread to another, thereby allowing a link between the threads to be marked within the one or more traces. The threads may reside on a single node and/or process or a plurality of nodes and/or processes.

With this aspect of the invention, sufficient information will be provided within the one or more traces to allow all the related trace data to be linked together. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is disclosed in a number of different embodiments as methods and mechanisms for debugging a series of related events within a computer system. Some of the embodiments described are directed to one or more series of related events that span across multiple processes and/or multiple nodes. However, the principles presented here are applicable to any series of related events, including a series of related events within a single process and/or single node, and thus the scope of the invention is not to be limited to the exact embodiments shown herein.

Figure 1:
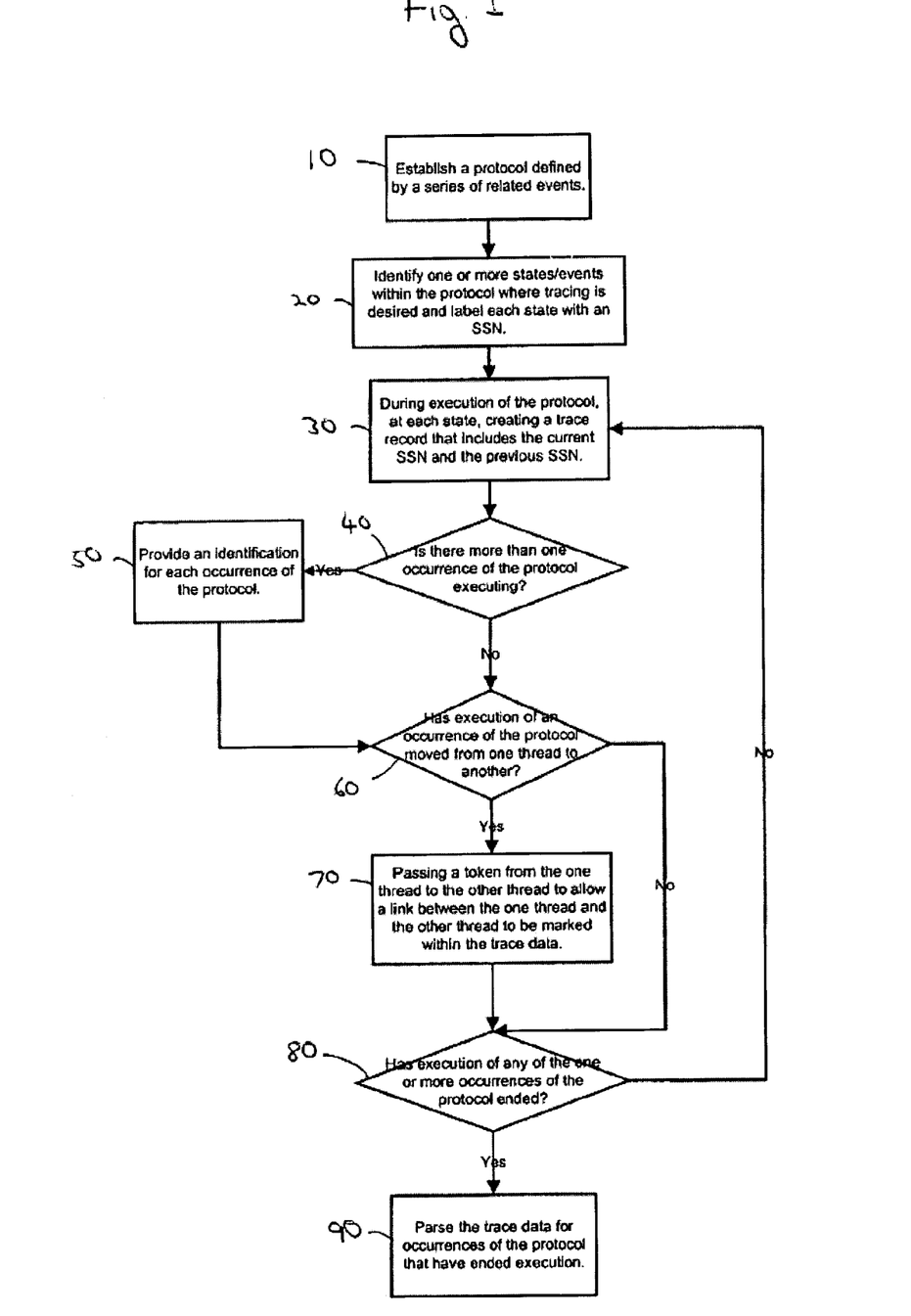
FIG. 1 is a flowchart of a method in accordance with the present invention.

Many computer applications execute one or more series of related events that span across multiple threads, processes, and/or nodes. For example, a computer application may be developed to query multiple databases residing on multiple nodes. The application may execute one or more queries that span across one or more of the multiple databases. When tracing such related events, trace data may be generated in multiple trace logs corresponding to the multiple nodes and/or processes. Manually navigating through the trace logs can be a difficult task. One method to alleviate the difficulty is to identify each state within the one or more sequence of related events where tracing is desired. Then, during execution, at each state, mark the current state and the previous state when tracing, even if the sequence of related events spans across a plurality threads, processes, and/or nodes. Turning to FIG. 1, a method of tracing a sequence of related events that span across a plurality of threads is illustrated. A series or sequence of related events may first be characterized or defined as a protocol (action block 10). The protocol definition may include an identification for the protocol and an entry point of the protocol.

After the protocol has been established (action block 10), one or more states and/or events within the protocol where tracing is desired may be identified and labeled sequentially with a number (hereinafter referred to as the "state sequence number" (SSN)) for identification (action block 20). During execution of the protocol, at each state, a trace record may be created which includes the current SSN and the previous SSN (action block 30), thus producing a "link list" of all the states, which facilitates in linking related trace data together.

If there is more than one occurrence of the protocol executing (decision block 40), then each occurrence may have a description for identification (action block 50). For example, each occurrence may be labeled sequentially with a number (hereinafter referred to as the "occurrence sequential number" (OSN)). The OSN may also be reflected in the trace record. It may be desirable to ensure that each OSN is unique. If the protocol spans across multiple nodes, then one approach to ensure uniqueness is to include the node number of the node that initiated the occurrence in the description of the OSN.

If the execution of an occurrence of the protocol moves from one thread to another (decision block 60), then it may be desirable to establish a link between the last trace record for the one thread and the first trace record for the other thread in order to continue the link list. One approach is to pass a token containing meta-data, such as the SSN of the last trace record for the one thread, from the one thread to the other thread, thereby allowing a link between the one thread and the other thread to be marked within the trace data (action block 70).

Figure 2:
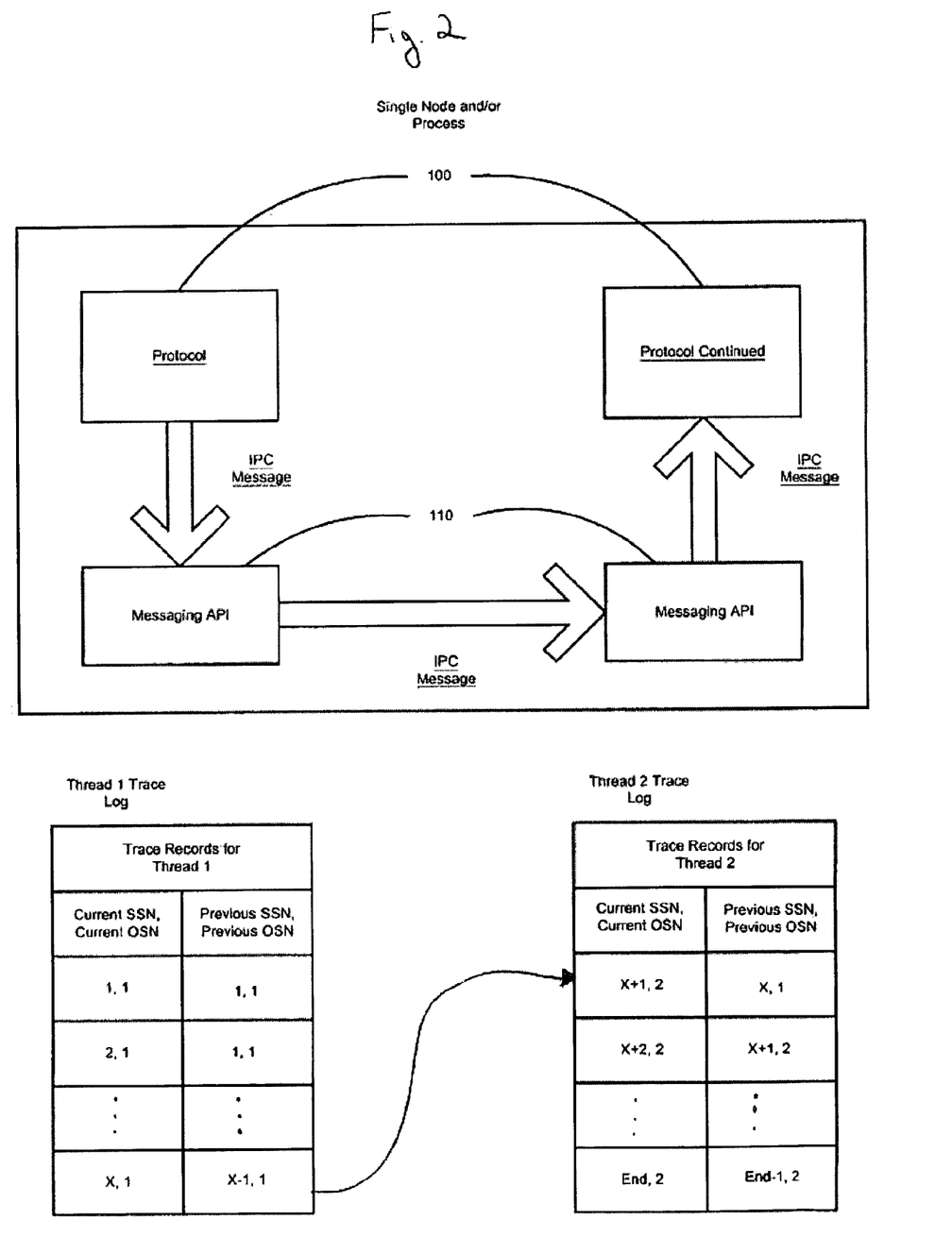
FIG. 2 is a diagram of a system architecture with which the present invention may be implemented.

Referring to FIG. 2, an approach to passing a token is illustrated. Generally, the execution of the protocol 100 may move from one thread 1 to another thread 2 by sending an inter-process communication (IPC) message between the threads. In this illustration, the threads reside on a single node and/or process. The IPC message may contain instructions to continue the protocol 100 on the other thread 2. This typically involves using a messaging API 110 having a "send message" type function. Examples of messaging APIs 110 include network layer APIs and shared resources such as shared disks and/or shared memory. When the send message type function is invoked, the messaging API 110 will send an IPC message generated by the protocol 100 on thread 1 to thread 2 to continue the execution of the protocol 100. The messaging API will relay the IPC message to thread 2. The figure represents the messaging API 110 as two entities, but the messaging API 110 may also be a single entity.

To enable a link to be established between thread 1 and thread 2 within the trace data, the trace record for the first state of the continuation of the protocol within thread 2, State X+1, may identify the SSN of the previous state, i.e., the last state reached, State X, in thread 1 before the execution of the protocol moved from thread 1 to thread 2. This may be achieved by passing a token from thread 1 to thread 2 containing meta-data regarding the execution of the protocol on thread 1, which may include the protocol identification, the OSN and the SSN of the last trace record, and the state of the protocol. A token that may be used in the illustration in FIG. 2, for example, may include the SSN and the OSN for State X, X,1. For multiple occurrences of the protocol, as can be appreciated by one of ordinary skill in the art, it may be desirable to couple the SSN and the OSN for each trace record to ensure that the related data are properly linked together.

One method to pass the token is to place the token within the IPC message sent by the protocol on thread 1, which may require the programmer of the protocol to develop code that passes the token. A preferred method is to "piggy back" the token to the IPC message, i.e., use the messaging API to append the token to the IPC message sent by the protocol on thread 1. For example, if the messaging API is a network layer API, then the token may be placed in the header of an IPC message being sent via the network layer API. An advantage of this technique is that the burden of passing the token is removed from the coding of the protocol. Alternatively, the IPC message may be the token itself.

Figure 3:
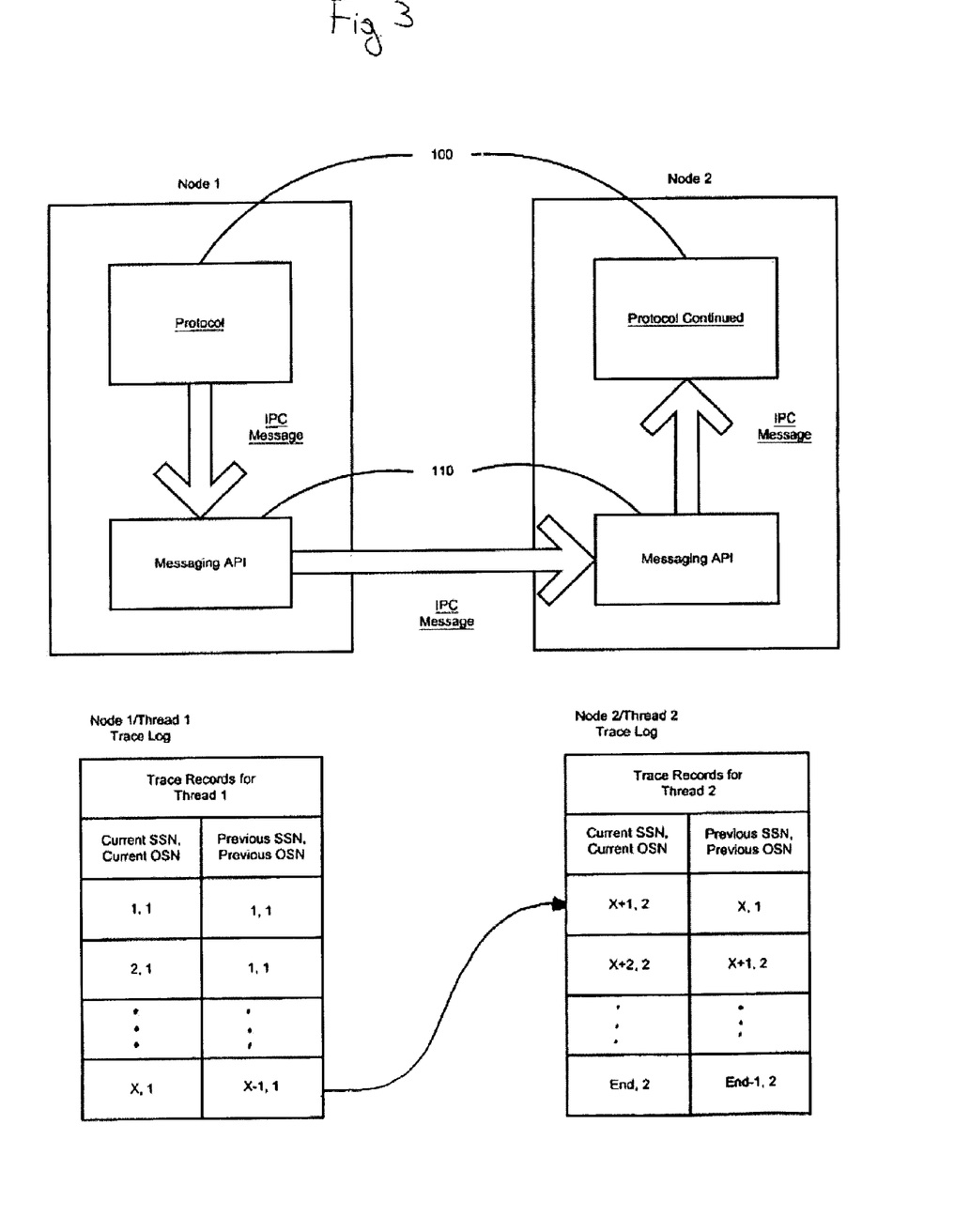
FIG. 3 is a diagram of another system architecture with which the present invention may be implemented.

Referring to FIG. 3, an approach to passing a token from one thread to another is illustrated, wherein the threads reside on different nodes. The execution of the protocol 100 may move from one node 1 to another node 2 by sending an IPC message between the nodes. Enabling a link to be established between the nodes uses the same principles described above. As mentioned above, the messaging API 110 may be a network layer API and/or a shared resource such as a shared disk.

Referring back to FIG. 1, if the execution of any of the occurrences of the protocol has ended (decision block 80), then the trace data may be parsed into a more readable format (action block 90). Since the trace has sufficient information to link related trace data together, a markup language may be used to hyperlink the related trace data, as described in U.S. patent application Ser. No. 09/872,647. Additionally, a trace format grammar may be used to parse the trace data, as described in U.S. patent application Ser. No. 09/872,590. A keyword, such as PROTOCOL, may be added into each trace record, so that a parsing application may identify each record within the trace data. The first SSN may be identified using a keyword such as PROT_BEGIN to specify the beginning of the protocol. In addition, the last SSN may be identified using a keyword such as PROT_END to specify the end of the protocol. Further, the trace data may be color coded, depending upon, for example, the protocol or the occurrence of a protocol.

In addition to the current SSN and the previous SSN, each trace record may also include the OSN, node information, process information, machine name, and other applicable trace data for that state. If the execution moves from one thread to another and an IPC message was sent, the IPC message may be placed in either, or both, the trace records for the last state reached on the one thread and the first state reached on the other node.

Figure 4:
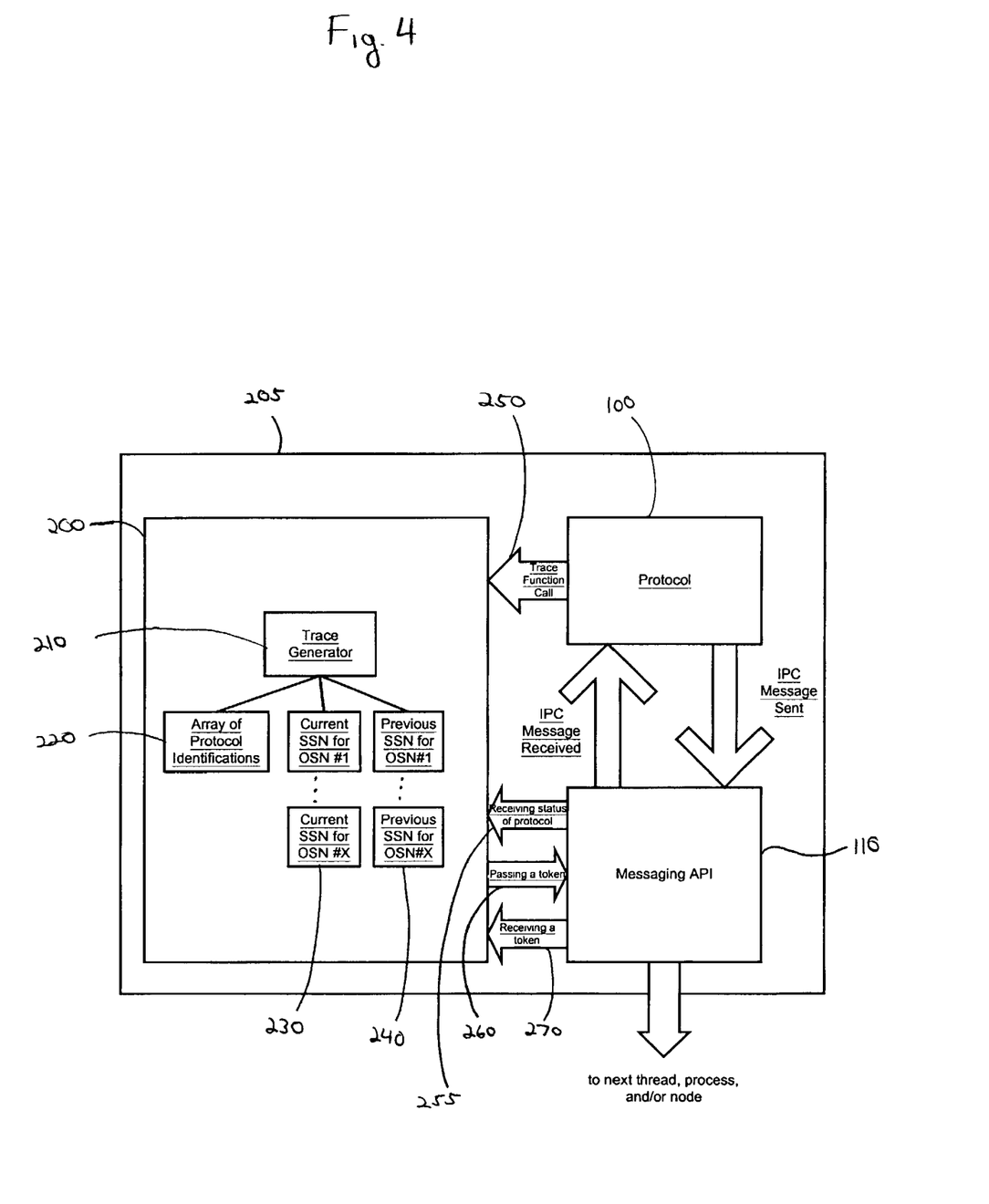
FIG. 4 is a diagram of a system in accordance with the present invention residing on a node.

FIG. 4 shows components of a tracing system 200 in accordance with an embodiment of the present invention. The system 200 may reside on a node 205 having a messaging API 110. The system may reside in shared memory within the node and may be configured for creating trace records, passing tokens, and receiving tokens for one or more occurrences of one or more series of related events defined as protocols 100 residing on the node 205.

In this embodiment, the developer of the protocol 100 may establish a plurality of states within the protocol 100—the system 200 may provide each state with a corresponding SSN. Each occurrence of the protocol 100 may have a corresponding OSN, as described above. The system 200 includes a trace generator 210, which creates the trace records for the one or more occurrences of the one or more protocols 100. The system 200 may further include an array of protocol identifications 220, which is a global array that includes the identifications of all the defined protocols 100 on the node 205. Each array element may include, in addition to the identification, an entry point for the protocol 100, which may be established by the developer of the protocol 100. Alternatively, the protocol identifications may be stored in a bit vector (not shown). The system 200 further includes one or more pairs of global variables, 230/240, for one or more occurrences of the one or more protocols 100 on the node 205, wherein each variable of a pair stores the current SSN 230 and the previous SSN 240 during the execution of the corresponding occurrence of the corresponding protocol 100.

At the beginning of the execution of an occurrence of the protocol 100, when the protocol 100 reaches the first state where tracing is desired, the protocol 100 may invoke a tracing function 250 of the system 200. As can be appreciated by one of ordinary skill in the art, this tracing function 250 may be similar to a "printf" function, wherein trace data is passed as an argument to the function. The trace generator 210 may, in response, refer to the array of protocol identifications 220 to determine which protocol 100 is calling the tracing function 250 and then update the corresponding current SSN 230 and previous SSN 240 variables. The initial values of the variables 230/240 point to the first SSN, which as mentioned above, may be given a special value such as PROT_BEGIN. As the subsequent states are reached and subsequent trace functions 250 are invoked, the current SSN 230 and previous SSN 240 are updated accordingly, i.e., the current SSN variable 230 will have the value of the SSN of the current state, e.g., the incremental value of the previous SSN, and the previous SSN variable 240 will have the value of the SSN of the previous state.

The trace generator 210 will further create a trace record corresponding to the current state, which may include the identification of the protocol 100, the OSN if applicable, i.e., if there is more than one occurrence of the protocol 100 in execution, the current SSN, the previous SSN, and any other applicable trace data, such as the trace data passed by the protocol in the tracing function call 250.

If the protocol 100 is configured to continue execution on another thread, then the system 200 may be configured to monitor the messaging API 110 to determine whether the protocol 100 sends an IPC message to another thread, or whether the protocol 100 receives an IPC message from another thread. This monitoring may be in the form of receiving notifications 255 from the messaging API 110 indicating whether an IPC message has been sent by the protocol 100 or received from an earlier sequence of a protocol 100 residing on another thread.

If an IPC message has been sent by the protocol 100 to a continuation of the protocol 100 on another thread, then the system 200 may pass a token 260 along with the IPC message sent. As described above, this may be achieved by appending the token to the IPC message, placing the token in the IPC message, or sending the token as an IPC message. The token may include meta-data such as the protocol identification, the OSN and the SSN of the last trace record, and the state of the protocol, which may be included as a trace record within the trace data.

Further, if an IPC message has been received by the messaging API 110, the system 200 may be notified 255 and retrieve the token 270 from the IPC message. The system 200 may then use the array of protocol identifications 220 to identify the protocol 100 that sent the IPC message and then either search for or create the corresponding current and previous SSN variables 230/240, which may be updated from the information provided by the token. The messaging API 110 then forwards the IPC message to the protocol 100 to continue execution. The meta-data within the token may be included as a trace record within the trace data.

When the execution of an occurrence of a protocol 100 has ended, the last SSN may be labeled with a special value, such as PROT_END. Subsequently, the trace data, which may reside in one or more trace logs, may be parsed and may further be converted into a markup language syntax as described in U.S. patent application Ser. No. 09/872,647. Further, as mentioned above, the trace records may be created in accordance with a trace format grammar and parsed using the systems and methods described in U.S. patent application Ser. No. 09/872,590.

The system 200 will produce trace data with information that enables all the related trace data to be linked together automatically, even if the trace data resides on multiple trace logs. The related trace data linked together, in conjunction with the trace format grammar and mechanisms described in U.S. patent application Ser. No. 09/872,590 and the markup language syntax described in U.S. patent application Ser. No. 09/872,647, facilitate in navigating through several occurrences of a number of protocols automatically, thus reducing the complexity of analysis.

SYSTEM ARCHITECTURE OVERVIEW

Figure 5:
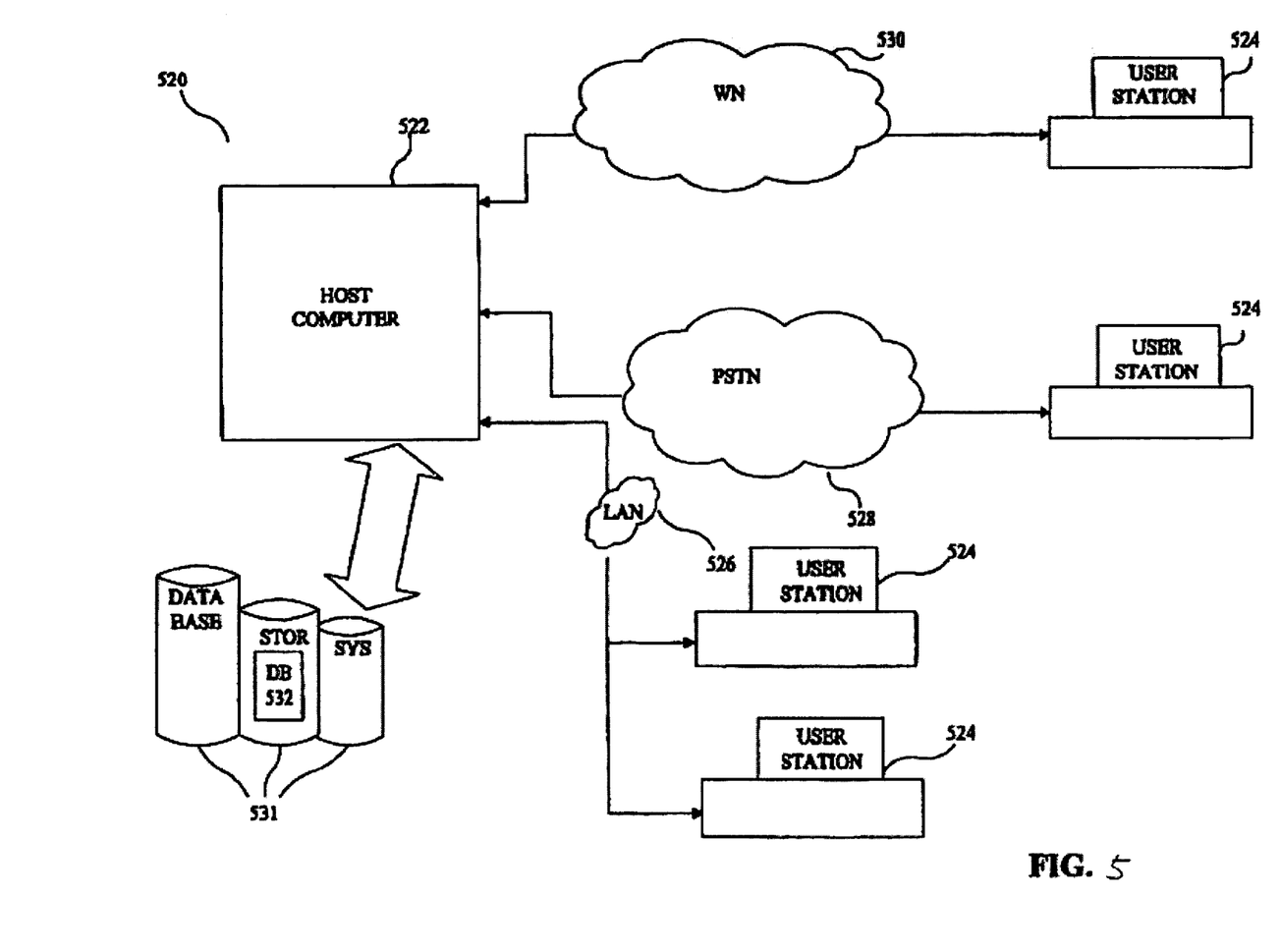
FIGS. 5 and 6 are diagrams of system architectures with which the present invention may be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public switched telephone network ("PSTN") 528 and/or a wireless network 530.

In an embodiment, the host computer 522 operates in conjunction with a data storage system 531, wherein the data storage system 531 contains a database 532 that is readily accessible by the host computer 522. Note that a multiple tier architecture can be employed to connect user stations 524 to a database 532, utilizing for example, a middle application tier (not shown). In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 522 can access two or more databases 532, stored in a variety of mediums, as previously discussed.

Figure 6:
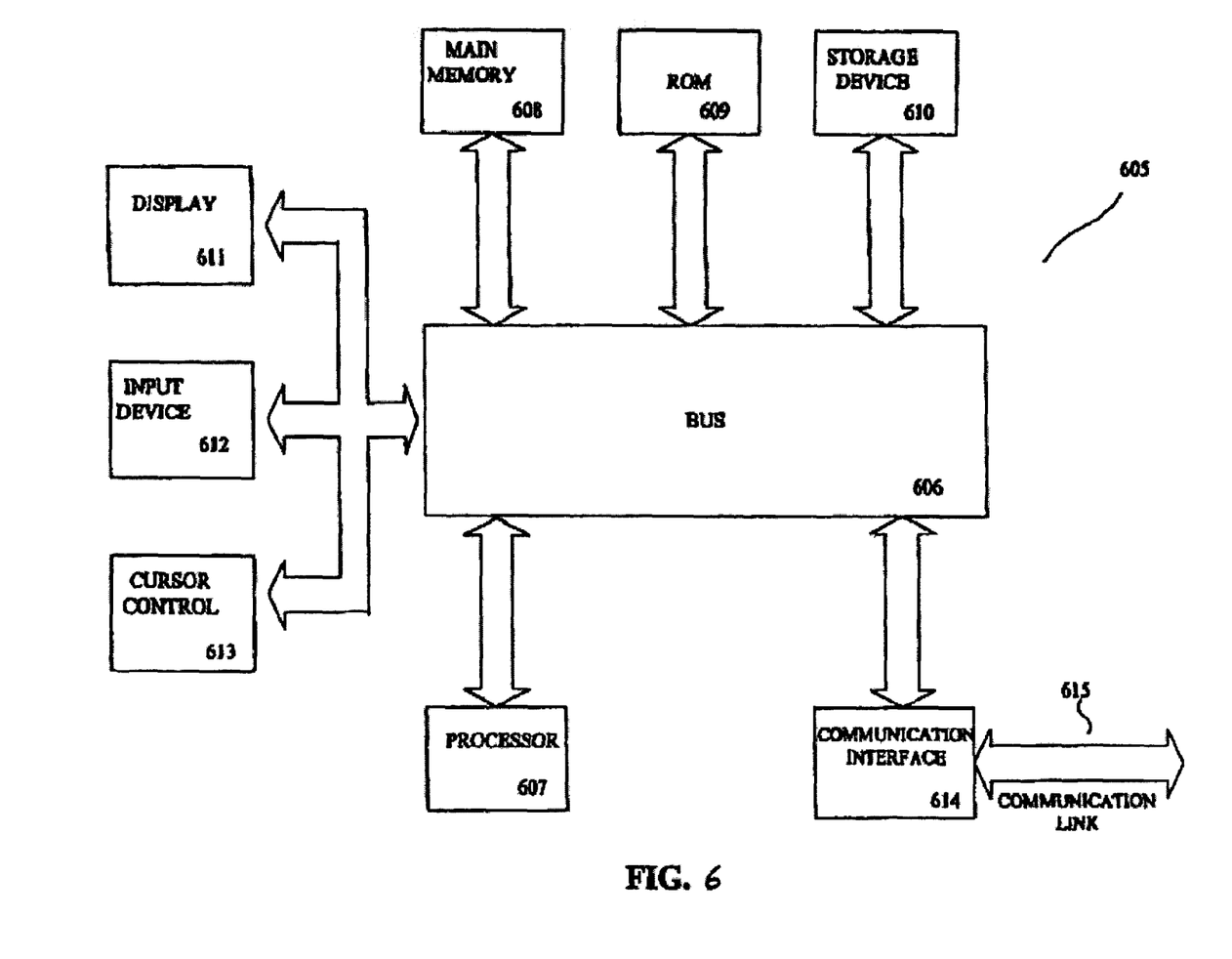

Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607. A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other columns, is coupled to the bus 606 for communicating information and command selections to the processor(s) 607. Another type of user input device may include a cursor control 613, such as, but not limited to, a mouse, a trackball, a fingerpad, or cursor direction columns, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments, of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile and volatile media. Non-volatile media, i.e., media that can retain information in the absence of power, includes the ROM 409. Volatile media, i.e., media that can not retain information in the absence of power, includes the main memory 608.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information. Various forms of computer-usable media may be involved in providing one or more sequences of one or more instructions to the processor(s) 607 for execution. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 624 and the host computer 622. The communication interface 614 of a respective processing unit transmits and receives electrical, electromagnetic or optical signals that include data streams representing various types of information, including instructions, messages and data. A communication link 615 links a respective user station 624 and a host computer 622. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for tracing one or more occurrences of one or more series of related events, comprising:

establishing a protocol that defines a series of related events, in which the protocol comprises an entry point for execution of the protocol;

identifying one or more states at one or more different points during execution within the protocol where tracing is desired, in which the protocol invokes one or more tracing functions at the one or more states identified;

during execution of one or more occurrences of the protocol, at each of the one or more states, determining one or more actions based upon the one or more states the protocol is currently at and marking a current state and a previous state within one or more trace records based at least in part upon an information of an occurrence of the execution of the protocol; and during execution of the one or more occurrences of the protocol, if the execution of the one or more occurrences of the protocol moves from one thread to a second thread, then passing one or more tokens from the one thread to the second thread to allow one or more links between the one thread and the second thread to be marked within one or more traces.

2. The method of claim 1, wherein the one thread and the second thread reside on different nodes.

3. The method of claim 1, further comprising parsing the one or more trace records.

4. The method of claim 3, wherein the parsing of the one or more trace records are executed after the execution of any of the one or more occurrences of the protocol has ended.

5. The method of claim 3, further comprising generating a Previously Presented version of the one or more traces using a markup language syntax.

6. The method of claim 1, in which the one or more trace records are compliant with a trace grammar that complies with rules of a meta-language grammar.

7. The method of claim 1, further comprising: labeling each state and or each event with a current and a previous sequence numbers.

8. The method of claim 1, further comprising:
labeling each of the one or more occurrences of the protocol with the information of an occurrence of the execution of the protocol which comprises a sequence number.

9. The method of claim 1, wherein the one or more tokens are passed via a messaging API.

10. The method of claim 9, wherein the messaging API is a shared resource.

11. The method of claim 10, wherein the shared resource is a shared disk.

12. The method of claim 10, wherein the shared resource is a shared memory.

13. The method of claim 9, wherein the messaging API is a network layer API.

14. The method of claim 1, wherein the one or more tokens comprise meta-data.

15. The method of claim 1, in which the one or more actions comprise invoking a tracing function.

16. The method of claim 1, in which the one or more actions comprise ending a tracing function.

17. The method of claim 1, in which the one or more actions comprise adjusting detail level of the one or more traces.

18. The method of claim 1, in which the thread comprises a node or a process.

19. A system residing on a node having a messaging API for tracing an execution of one or more related events comprising:
means for establishing a protocol that defines a series of related events, in which the protocol comprises an entry point for execution of the protocol;
means for identifying one or more states at one or more different points during execution within the protocol where tracing is desired, in which the protocol invokes one or more tracing functions at the one or more states identified;
during execution of one or more occurrences of the protocol, at each of the one or more states, a processor means for determining one or more actions based upon the one or more states the protocol is currently at and means for marking a current state and a previous state within one or more trace records based at least in part upon an information of an occurrence of the execution of the protocol; and
means for passing one or more tokens from one thread to a second thread if the one or more occurrences of the protocol move from the one thread to the second thread to allow one or more links between the one thread and the second thread to be marked within one or more traces.

20. The system of claim 19, further comprising an array of protocol identifications, which stores the identifications of the protocol.

21. The system of claim 19, further comprising a bit vector of protocol identifications which stores the identifications of the protocol.

22. The system of claim 19, wherein the system is configured for sending and receiving the one or more tokens via the messaging API.

23. The system of claim 19, wherein the messaging API is a network layer.

24. The system of claim 19, wherein the messaging API is a shared resource.

25. The system of claim 19, wherein the one or more tokens comprise meta-data.

26. The system of claim 19, further comprising one or more pairs of global variables for the one or more occurrences of the protocol, wherein the first of the pair stores a current state and the second of the pair stores a previous state for the one or more occurrences of the protocol.

27. The system of claim 19, further comprising a mechanism for parsing the trace records generated by a trace generator.

28. A computer program product that includes a medium usable by a general purpose computer storing a sequence of instructions which, when executed by a processor, causes said processor to execute a process for tracing one or more occurrences of one or more series of related events, said process comprising:
establishing a protocol that defines a series of related events, in which the protocol comprises an entry point for execution of the protocol;
identifying one or more states at one or more different points during execution within the protocol where tracing is desired, in which the protocol invokes one or more tracing functions at the one or more states identified;
during execution of one or more occurrences of the protocol, at each of the one or more states, determining one or more actions based upon the one or more states the protocol is currently at and marking a current state and a previous state within one or more trace records based at least in part upon an information of an occurrence of the execution of the protocol; and
during execution of the one or more occurrences of the protocol, if the execution of the one or more occurrences of the protocol moves from one thread to a second thread, then passing one or more tokens from the one thread to the second thread to allow one or more links between the one thread and the second thread to be marked within one or more traces.

29. The computer program product of claim 28, further comprising parsing the one or more traces.

30. The computer program product of claim 29, wherein the parsing of the one or more traces is executed after the execution of any of the one or more occurrences of the protocol has ended.

31. The computer program product of claim 30, further comprising generating a Previously Presented version of the one or more traces using a markup language syntax.

32. The computer program product of claim 28, wherein the one or more traces are compliant with a trace grammar that complies with rules of a meta-language grammar.

33. The computer program product of claim 28, further comprising: labeling each state with a sequence number.

34. The computer program product of claim 28, further comprising: labeling each of the one or more occurrences of the protocol with a sequence number.

35. The computer program product of claim 28, wherein the one or more tokens are passed via a messaging API.

36. The computer program product of claim 35, wherein the messaging API is a network layer API or a shared resource.

37. The computer program product of claim 36, wherein the shared resource is a shared disk or a shared memory.

38. The computer program product of claim 28, wherein the one or more tokens comprise meta-data.

* * * * *

UNITED STATES PATENT AND TRADEMARK OFFICE
CERTIFICATE OF CORRECTION

| | | |
|---|---|---|
| PATENT NO. | : 7,512,954 B2 | Page 1 of 1 |
| APPLICATION NO. | : 10/208120 | |
| DATED | : March 31, 2009 | |
| INVENTOR(S) | : Srivastava et al. | |

It is certified that error appears in the above-identified patent and that said Letters Patent is hereby corrected as shown below:

On title page, in column 1, item [73] "Assignee", line 2, before "Redwood" insert -- 500 Oracle Parkway --.

In column 1, line 31, delete "modem" and insert -- modern --, therefor.

In column 7, line 36, delete "embodiments," and insert -- embodiments --, therefor.

In column 7, line 44, delete "409." and insert -- 609. --.

In column 8, line 63, in claim 5, delete "Previously Presented version" and insert -- new version --, therefor.

In column 9, line 2, in claim 7, delete "and or" and insert -- and/or --, therefor.

In column 10, line 45, in claim 31, delete "Previously Presented version" and insert -- new version --, therefor.

Signed and Sealed this

Twenty-fifth Day of May, 2010

David J. Kappos
*Director of the United States Patent and Trademark Office*